US012791154B2

(12) United States Patent
Vawter et al.

(10) Patent No.: US 12,791,154 B2
(45) Date of Patent: Nov. 10, 2026

(54) SOLAR POWERED PORTABLE TOWER

(71) Applicant: Eversun Energy Inc., San Diego, CA (US)

(72) Inventors: Austin Vawter, San Diego, CA (US); Muhammad Nasar, Giza (EG); Ryan Liu, San Diego, CA (US); Farhan Naeem, Irvine, CA (US)

(73) Assignee: Eversun Energy Inc., San Diego, CA (US)

( * ) Notice: Subject to any disclaimer, the term of this patent is extended or adjusted under 35 U.S.C. 154(b) by 0 days.

(21) Appl. No.: 18/987,024

(22) Filed: Dec. 19, 2024

(65) Prior Publication Data

US 2025/0334235 A1 Oct. 30, 2025

Related U.S. Application Data

(63) Continuation of application No. 18/644,313, filed on Apr. 24, 2024, now Pat. No. 12,209,718.

(51) Int. Cl.

| | |
|---|---|
| ***F21L 4/08*** | (2006.01) |
| ***E04H 12/18*** | (2006.01) |
| ***F21V 21/22*** | (2006.01) |
| ***H02S 20/30*** | (2014.01) |
| ***H02S 30/20*** | (2014.01) |

(52) U.S. Cl.

CPC .............. *F21L 4/08* (2013.01); *E04H 12/182* (2013.01); *F21V 21/22* (2013.01); *H02S 20/30* (2014.12); *H02S 30/20* (2014.12)

(58) Field of Classification Search

CPC .. F21L 4/08; F21V 21/22; H02S 30/20; F21S 9/03; F21S 9/032; F21S 9/035; F21S 9/037; F21W 2131/10

See application file for complete search history.

(56) References Cited

U.S. PATENT DOCUMENTS

| | | | | |
|---|---|---|---|---|
| 7,470,036 | B2 | 12/2008 | Deighton et al. | |
| 7,484,858 | B2 | 2/2009 | Deighton et al. | |
| 9,242,764 | B2 | 1/2016 | Zetterlund | |
| 9,816,661 | B2 | 11/2017 | Sharrah et al. | |
| 10,378,739 | B2 | 8/2019 | Harvey et al. | |
| 11,143,389 | B2 * | 10/2021 | Proeber ................. | F21V 29/508 |
| 11,489,484 | B2 * | 11/2022 | Chentnik ................ | F24S 25/10 |
| 2010/0156339 | A1 | 6/2010 | Hoffman | |
| 2012/0181979 | A1 | 7/2012 | Hudspeth et al. | |

(Continued)

FOREIGN PATENT DOCUMENTS

| | | | |
|---|---|---|---|
| AU | 2014208237 | A1 | 8/2014 |
| CN | 201499108 | U | 6/2010 |

(Continued)

*Primary Examiner* — Robert J May

(74) *Attorney, Agent, or Firm* — Carlson, Gaskey & Olds, P.C.

(57) ABSTRACT

A portable tower includes a head assembly, a pole section, a plurality of legs, and a solar panel assembly. The pole section includes a telescoping section movable between a retracted position and an extended position, and the telescoping section is mounted to the head assembly. The plurality of legs are mounted to the pole section and are each movable between a stowed position and a deployed position. The solar panel assembly includes a plurality of foldable solar sections and is movable between a folded and an unfolded position.

20 Claims, 11 Drawing Sheets

(56) References Cited

U.S. PATENT DOCUMENTS

| | | | | |
|---|---|---|---|---|
| 2012/0212942 | A1 | 8/2012 | Chen et al. | |
| 2013/0188340 | A1* | 7/2013 | Richards | A01G 7/045 362/183 |
| 2014/0347873 | A1 | 11/2014 | Robertson et al. | |
| 2018/0058673 | A1 | 3/2018 | Fang | |
| 2018/0119935 | A1 | 5/2018 | Proeber et al. | |
| 2020/0191343 | A1* | 6/2020 | Zhou | F21V 15/012 |
| 2021/0247059 | A1* | 8/2021 | Johnson | F21V 21/145 |
| 2023/0033406 | A1 | 2/2023 | Sayles | |
| 2023/0175658 | A1 | 6/2023 | Roberts | |
| 2024/0077181 | A1 | 3/2024 | Dee et al. | |

FOREIGN PATENT DOCUMENTS

| | | | | |
|---|---|---|---|---|
| CN | 202927503 | U | | 5/2013 |
| CN | 208397773 | U | * | 1/2019 |
| CN | 112532167 | A | | 3/2021 |
| CN | 115171341 | A | | 10/2022 |
| JP | 2010034190 | A | | 2/2010 |
| JP | 5160932 | B2 | | 3/2013 |
| JP | 3211938 | U | | 8/2017 |
| JP | 7257804 | B2 | | 4/2023 |
| KR | 101334302 | B1 | | 12/2013 |
| WO | 2022263460 | A1 | | 12/2022 |
| WO | 2023281322 | A1 | | 1/2023 |

* cited by examiner

SOLAR POWERED PORTABLE TOWER

CROSS-REFERENCE TO RELATED APPLICATION

This application is a continuation of U.S. patent application Ser. No. 18/644,313 filed on Apr. 24, 2024.

BACKGROUND

The present invention relates to the field of portable towers, which may be deployed for a variety of purposes. Portable towers may be set up in a desired location and extend to provide a mounted device some height from the ground. Some portable towers include lamps to provide lighting to sports fields, stadiums, and other outdoor areas to allow use of such areas at night time. Other portable towers may provide a vantage for security cameras, for example to monitor a parking lot.

Portable towers have typically required the use of batteries charged by an electrical grid or a direct connection to an electrical grid. This can be limiting, for example, in more remote areas where an electrical grid grid is unavailable. Further, electrical grids may be powered by relatively less environmentally friendly sources. The portable towers of this disclosure utilize a unique foldable solar array configuration to provide power to a portable tower while maintaining ease of transportation.

SUMMARY

In one exemplary embodiment a portable tower includes a head assembly, a pole section including a telescoping section movable between a retracted position and an extended position and mounting the head assembly, a plurality of legs mounted to the pole section and movable between a stowed position and a deployed position, and a solar panel assembly mounted to one of the legs.

In another embodiment according to any of the previously described embodiments, the portable tower further includes a lamp mounted to the head assembly.

In another embodiment according to any of the previously described embodiments, the portable tower further includes a battery mounted to the pole section, the battery configured to provide power to the lamp.

In another embodiment according to any of the previously described embodiments, the battery is configured to store power generated by the solar panel assembly.

In another embodiment according to any of the previously described embodiments, the portable tower further includes a user interface configured to allow a user to control operation of the lamp.

In another embodiment according to any of the previously described embodiments, the user interface is configured to display information relating to at least one of a dimming level of the lamp, energy storage of the battery, and power generation of the solar panel assembly.

In another embodiment according to any of the previously described embodiments, the portable towers further includes a camera mounted to the head assembly.

In another embodiment according to any of the previously described embodiments, the solar panel assembly includes a plurality of foldable solar sections and is movable between a folded position and an unfolded position.

In another embodiment according to any of the previously described embodiments, the foldable solar sections are stacked upon each other in the folded position and lay flat and adjacent to each other in the unfolded position.

In another embodiment according to any of the previously described embodiments, the foldable solar sections include an outermost section spaced from the leg when the solar panel assembly is in the unfolded position, and the outer section is stacked between two other of the foldable sections in the folded position.

In another embodiment according to any of the previously described embodiments, the foldable solar sections include a uniform length that is longer than a uniform width, the length running in a direction parallel to the leg mounting the solar panel assembly.

In another embodiment according to any of the previously described embodiments, each foldable solar section includes a plurality of solar cells spaced along its length.

In another embodiment according to any of the previously described embodiments, the solar cells of each foldable solar section are wired in series, and the plurality of foldable solar sections are wired in parallel with respect to each other.

In another embodiment according to any of the previously described embodiments, the portable tower includes four legs and a respective solar panel assembly is mounted to each of the legs.

In another embodiment according to any of the previously described embodiments, each of the solar panel assemblies include a plurality of foldable solar sections and are movable between a folded position and an unfolded position.

In another embodiment according to any of the previously described embodiments, each of the plurality of legs are rotatable about a hinge mounted to the pole section, and a leg support connects between each leg and the pole section. The leg support is extendable as the leg moves between the stowed position and the deployed position, and the leg support is configured to lock at a desired length in the deployed position.

In another exemplary embodiment a portable tower includes a head assembly mounting a lamp, a pole section mounting the head assembly, and a solar panel assembly connected to the pole section. The solar panel assembly includes a plurality of foldable solar sections movable between a folded position and an unfolded position.

In another embodiment according to any of the previously described embodiments, the plurality of foldable solar sections are stacked upon each other in the folded position and lay flat and adjacent to each other in the unfolded position.

In another embodiment according to any of the previously described embodiments, the portable tower further includes a battery mounted to the pole section. The battery is configured to provide power to the lamp and store power generated by the solar panel assembly.

In another embodiment according to any of the previously described embodiments, the portable tower further includes a plurality of legs mounted to the pole section, each of the plurality of legs movable between a stowed position and a deployed position. The solar panel assembly is mounted to one of the legs.

DETAILED DESCRIPTION

This disclosure details a portable tower with legs that include a foldable solar assembly for powering the portable tower.

Figure 1:
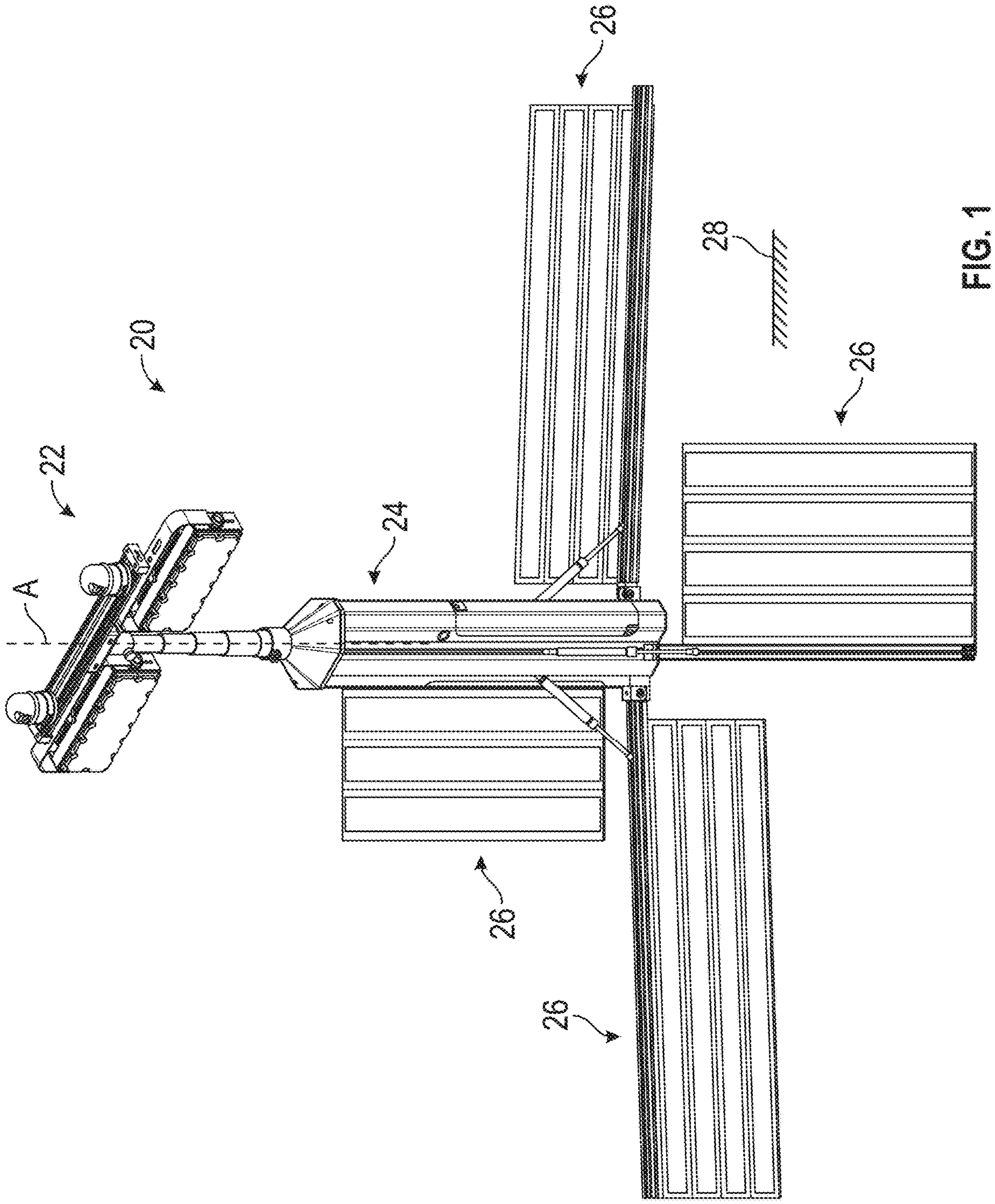
FIG. 1 illustrates a portable tower.

FIG. 1 illustrates an example portable tower 20 according to this invention. The tower 20 includes a head assembly 22, a pole section 24, and leg assemblies 26. The leg assemblies 26 are configured to rest on a floor or ground 28, and the pole section 24 connects between the leg assemblies 26 and head assembly 22.

Figure 2:
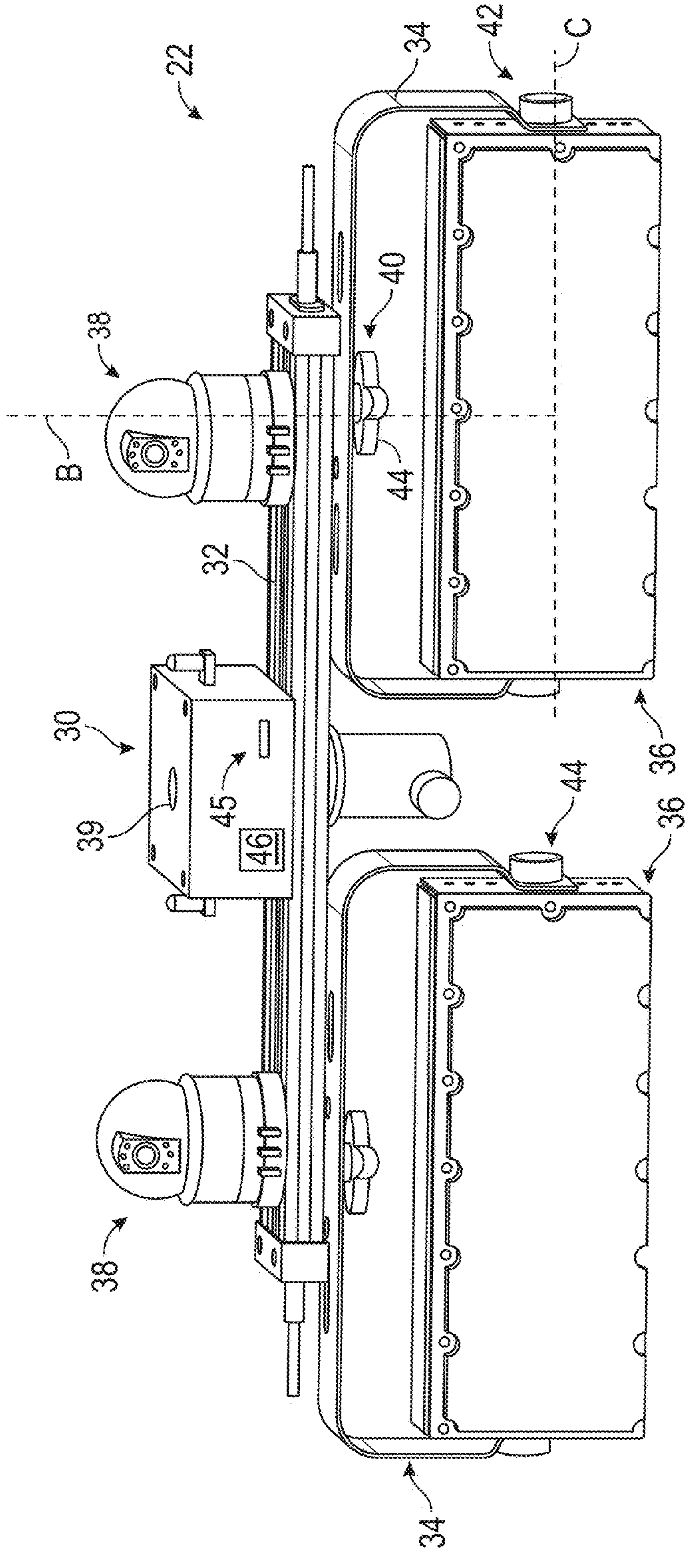
FIG. 2 illustrates a head assembly of the portable tower.

FIG. 2 illustrates an example head assembly 22 detached from the pole section 14. The head assembly 22 in this example includes a head base 30, a head arm 32, two light mounts 34, two lamps 36, two cameras 38, and a level 39.

The head base 30 sits on top of and extends through the head arm 32 and is configured to removably engage with the pole section 24. The head arm 32 extends laterally from the head base 30 to support the light mounts 34 such that the light mounts 34 and lamps 36 are laterally spaced from the pole section 24 when the head assembly 22 is installed. In an example, the pole section 24 extends about a longitudinal axis A and the head assembly 22 may be secured at any desired rotational orientation about that axis A.

The light mounts 34 are rotatably supported by the head arm 32 at arm joints 40 which allow the light mounts 34 to rotate about axes B which are parallel to the axis A of the pole section 24 when the head assembly 22 is installed. The lamps 36 are rotatably supported within the light mounts 34 by mount joints 42 on two opposed lateral sides of the lamps 36 to rotate about axes C which lie in a plane normal to the axes B. The arm joints 40 and mount joints 42 may include knobs 44, which may provide a grip for a user. The arm joints 40, mount joints 42, and knobs 44 allow a user to orient the lamps in any desired angular position.

The lamps 36 in this example may be light-emitting diode (LED) lamps. In an example, the lamps 36 are each 21,300 lumen LED lamps such that the head assembly 22 emits a total of 52,600 lumens. In other examples, the lamps 36 may each be 50,000 lumen LED lamps, for a total of 100,000 lumens. In other examples, the head assembly 22 may be a 40,000 lumen light head emitting a relatively narrow beam of light, or a red, green, blue (RGB) lamp head emitting colorful light. In an example, the head assembly 22 as a whole or individual lamps 36 are interchangeable on the portable tower 20 with other head assemblies and/or lamps, such that a user may select a desired lighting effect. While two lamps 36 are shown in the illustrated embodiment, it should be understood that other numbers of lamps 36 may be used within the scope of this disclosure, for example the head assembly 22 may include four lamps 36.

The cameras 38 in this example sit on top of the head arm 32 at a location laterally spaced from the head base 30. In an example, the cameras 38 are located such the axes B of the light mounts 34 extend through the cameras 38. In an example, the cameras 38 are pan-tilt-zoom cameras, capable of panning horizontally, tilting vertically, and zooming for magnification. While two cameras 38 are illustrated, it should be understood that a single camera or any number or cameras may be used according to this disclosure.

While lamps 36 and cameras 38 are shown in the illustrated embodiment, it should be understood that the head assembly 22 may mount any other useful component, for example speakers, environmental monitoring equipment, radars, antennas, etc. The head base 30 may further include one or more outlet ports 45, such as USB-C ports, to allow a user to plug in any equipment desired to be mounted on the head assembly 22 of the portable tower 20.

In an example, the level 39 sits on top of the head base 30 and allows a user to make sure that the portable tower 20 extends vertically and is not skewed relative to the ground 28 when deployed to ensure stability. The level 39 may be a bulls-eye level, for example.

Electrical wiring (not shown) runs through the interior of the components of the head assembly 22. The electrical wiring runs from the head base 30, through the head arm 32, then through the arm joints 40 to the light mounts 34, then through the mount joints 42 to the lamps 36. The electrical wiring also runs from the head base 30, through the head arm 32, to the cameras 38. The head base 30 includes a control 46 connected to the electrical wiring that converts electricity delivered to the head assembly 22 to an appropriate voltage and power required by the lamps 36 and cameras 38. The control 46 further controls activation of the lamps 36 and cameras 38. In an example, the control 46 communicates with an ambient light sensor to allow for automated powering on/off of the lamps 36 based on ambient light conditions.

Figure 3:
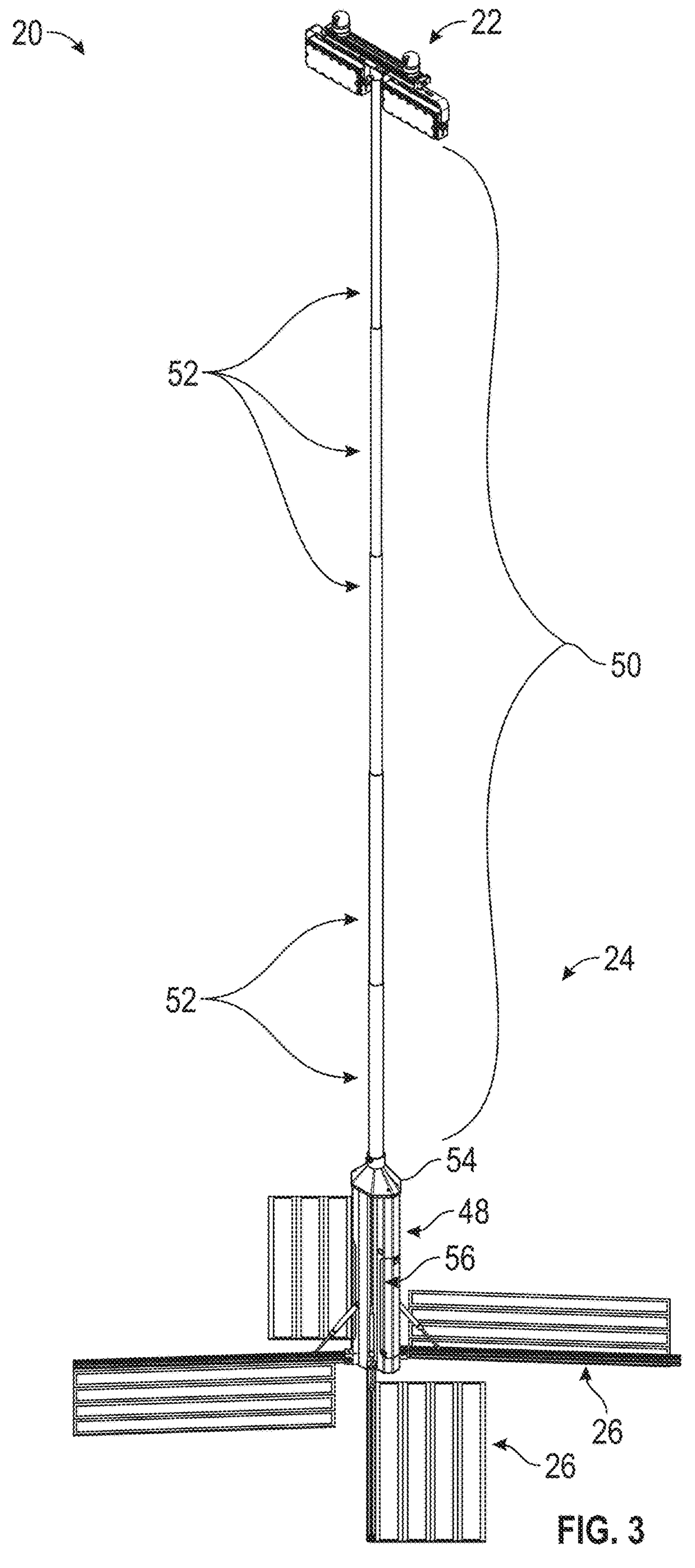
FIG. 3 illustrates the portable tower in a fully deployed position.

The pole section 24 includes a pole base 48 and a telescoping section 50. FIG. 3 illustrates the portable tower 20 in a fully deployed position wherein the telescoping section 50 is in an extended position relative to the retracted position of FIG. 1. The telescoping section 50 includes a plurality of telescoping or nested tubes 52 of incrementally smaller size with the smallest tube 52 configured to connect to the head assembly 22.

In an example, the tubes 52 of the telescoping section 50 are cylindrical, however the tubes 52 could include cross-sections that are square, rectangular or any other shape. Telescoping section 50 includes a locking mechanism such that a user can extend the telescoping section 50 and head assembly 22 to a desired height and then lock the tubes 52 in place. In an example, the portable tower 20 can extend from a height of about 5 ft from the ground 28 when the telescoping section 50 is fully retracted (FIG. 1) to a maximum height of about 25 ft from the ground 28 when the telescoping section 50 is fully extended (FIG. 3).

The pole base 48 mounts the leg assemblies 26 and includes a hollow interior that houses portions of the tubes 52 that are not fully extended into the telescoping section 50. The pole base 48 also houses various electronical components, as discussed further below. In an example, the pole base 48 includes a generally octagonal cross section, with two elongated sides. The pole base 48 may also include a slanted end cap 54 forming a transition between the main body of the pole base 48 and the telescoping section 50. In an example, the end cap 54 has an octagonal pyramid shape.

Electrical wiring (not shown) runs through the interior of the pole section 24 from the pole base 48 through the telescoping section 50. The electrical wiring of the pole section 24 may be connectable to the electrical wiring of the head assembly 22 to deliver power through the pole section 24 to the lamps 36 and cameras 38.

In an example, the pole base 48 is configured to mount one or more battery packs 56 that are removably attachable to the pole base 48. In the illustrated example, two battery packs 56 are mounted to the pole base 48, however more or less battery packs may be used within the scope of this disclosure. The battery packs 56 are configured to power the components of the head assembly 22 for about eight hours at maximum brightness, or up to about 15 days with the lamps 36 set to minimum brightness on a single charge. In other examples, the battery packs 56 may be lithium-ion batteries, sodium-ion batteries, lithium-iron-phosphate batteries, or any other appropriate type of battery. The battery packs 56 in an example each include a built-in gas gauge configured to measure accumulated energy or charge level, as well as temperature. The battery packs 56 may be mounted on the pole base 48 such that they sit flush with the exterior surfaces of the pole base 48 and extend in a longitudinal direction parallel to the axis A of the pole section 24. In the illustrated example, the two battery packs 56 are disposed on opposed lateral sides of the pole base 48.

Figure 4:
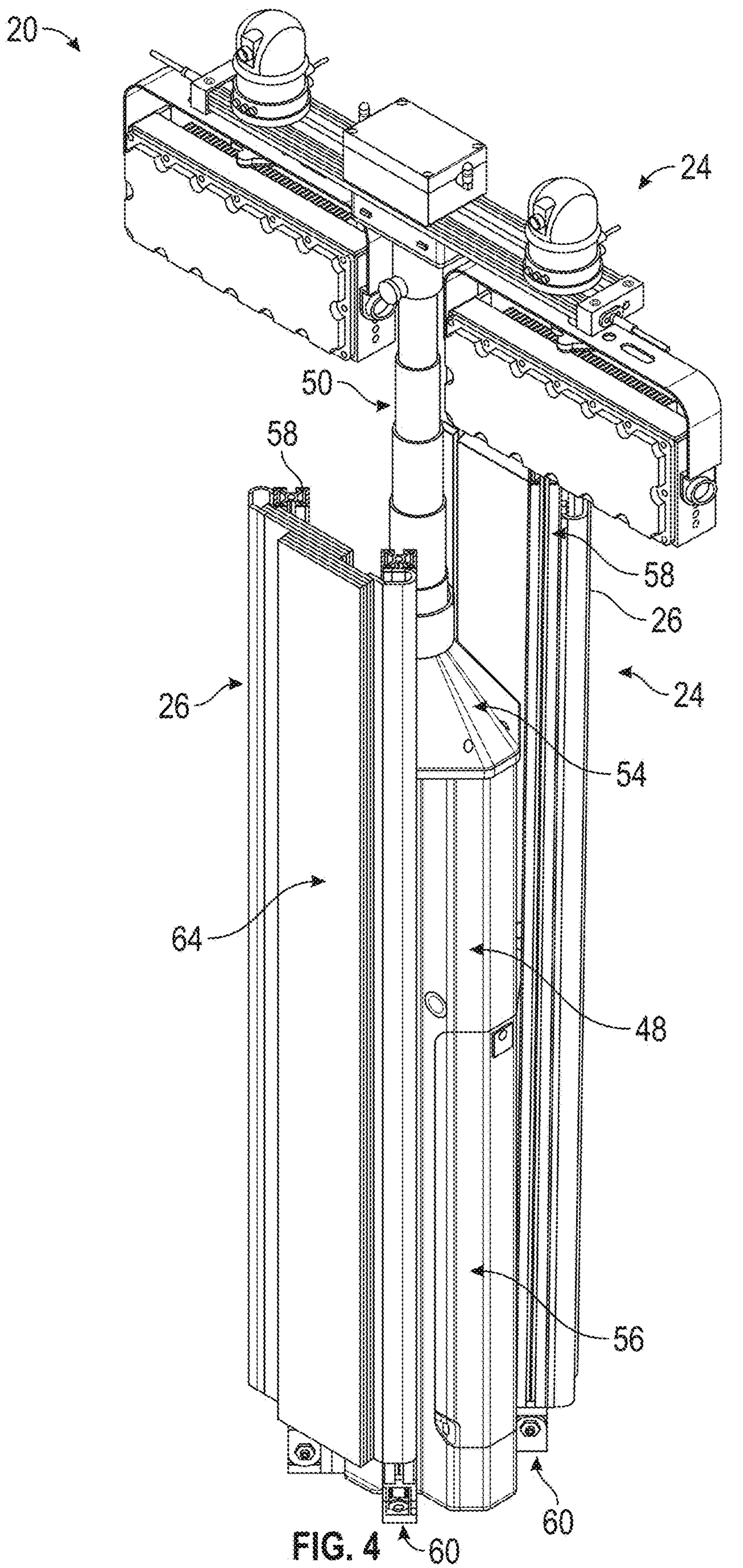
FIG. 4 illustrates the portable tower in a fully collapsed position.
Figure 5:
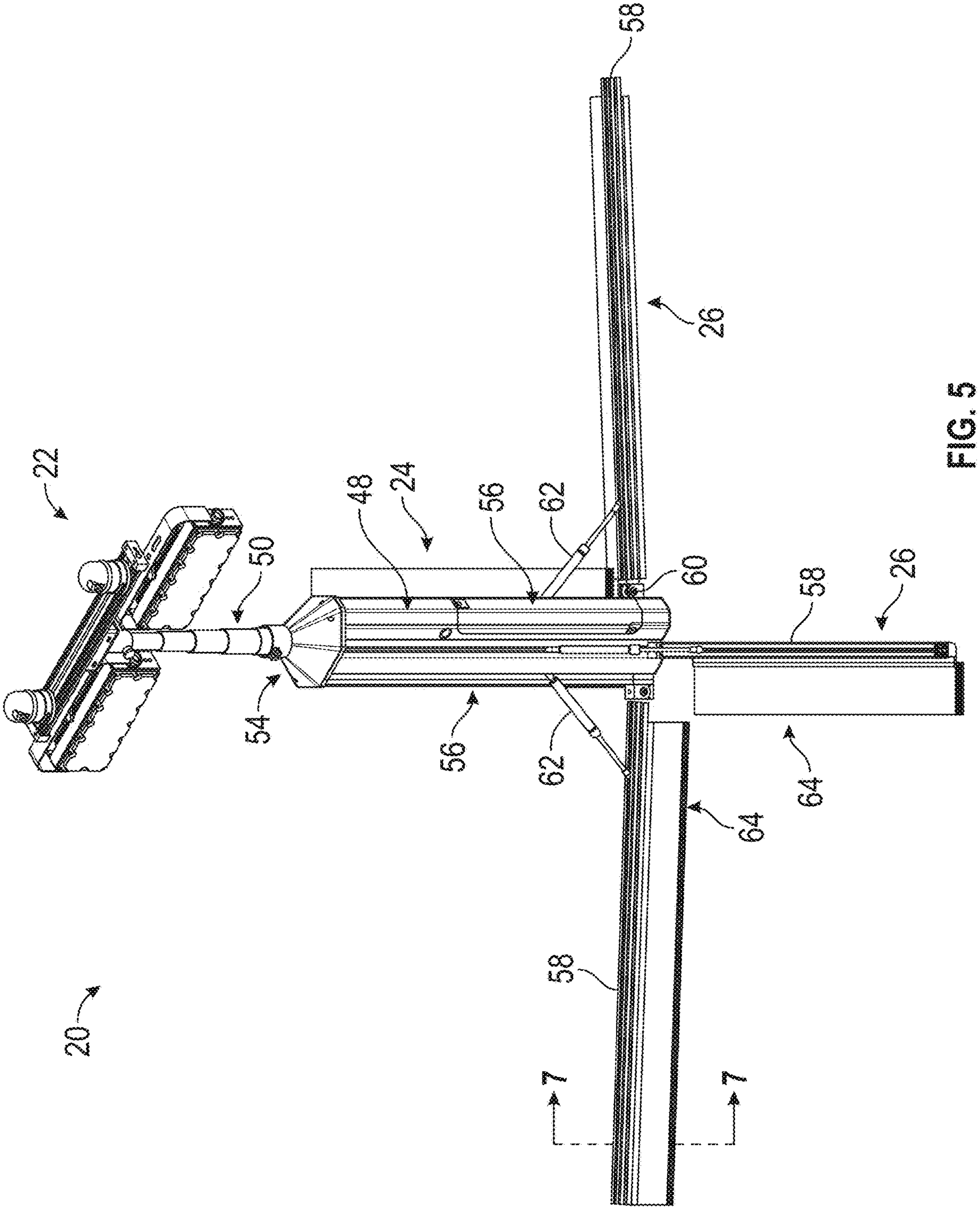
FIG. 5 illustrates the portable tower with legs in a deployed positions and solar assemblies in a folded position.

FIG. 4 illustrates the portable tower 20 in a fully collapsed position with the leg assemblies 26 of the portable tower 20 in a stowed position. FIG. 5 illustrates the portable tower 20 with the leg assemblies 26 in a partially deployed position. The portable tower 20 in this non-limiting example includes four leg assemblies 26, although any number of legs assemblies 26 may be used within the scope of this disclosure. Each leg assembly 26 includes a leg 58, a hinge 60, a leg support 62, and a foldable solar panel assembly 64.

The leg 58 of each leg assembly 26 is pivotably connected to the pole base 48 via a hinge 60. This connection via the hinge 60 allows each leg 58 to rotate relative to the pole section 24 from the stowed position (FIG. 4) to a deployed position (FIG. 5). In the stowed position, the legs 58 generally extend parallel to the axis A of the pole section 24. In the deployed position, the legs 58 rest on the ground 28, and may extend generally perpendicular to the axis A of the pole section 24.

Leg supports 62 also may extend between each leg 58 and the pole base 48. In an example, the leg support 62 of each leg assembly 26 is pivotably mounted to the leg 58 and pole base 48 at locations spaced from the hinge 60. The leg supports 62 in the illustrated example are locking gas struts, although any other appropriate supporting mechanism may be used. The leg supports 62 in this example are extendable from the stowed position to the deployed position, and may be locked at the length of the deployed position. Thus, in the deployed position, the legs 58 and leg supports 62 hold up the portable tower in a vertically upright position relative to the ground 28. In an example, the leg supports 62 may be adjusted to change the angle of the legs 58 relative to the pole section 24 and accommodate for uneven ground 28. In an example, the legs 58 are extrusions that include T-shaped slots to facilitate attachment of the leg supports 62 and the solar panel assembly 64.

Figure 6:
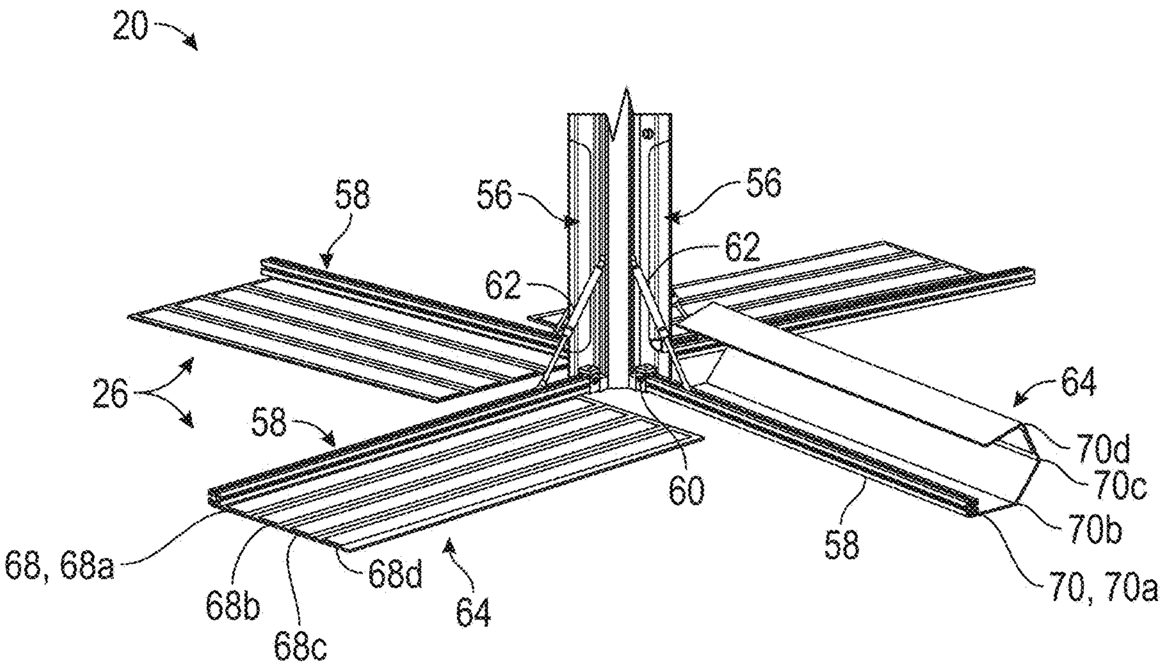
FIG. 6 illustrates the portable tower with a solar panel assembly in the process of unfolding.
Figure 7:
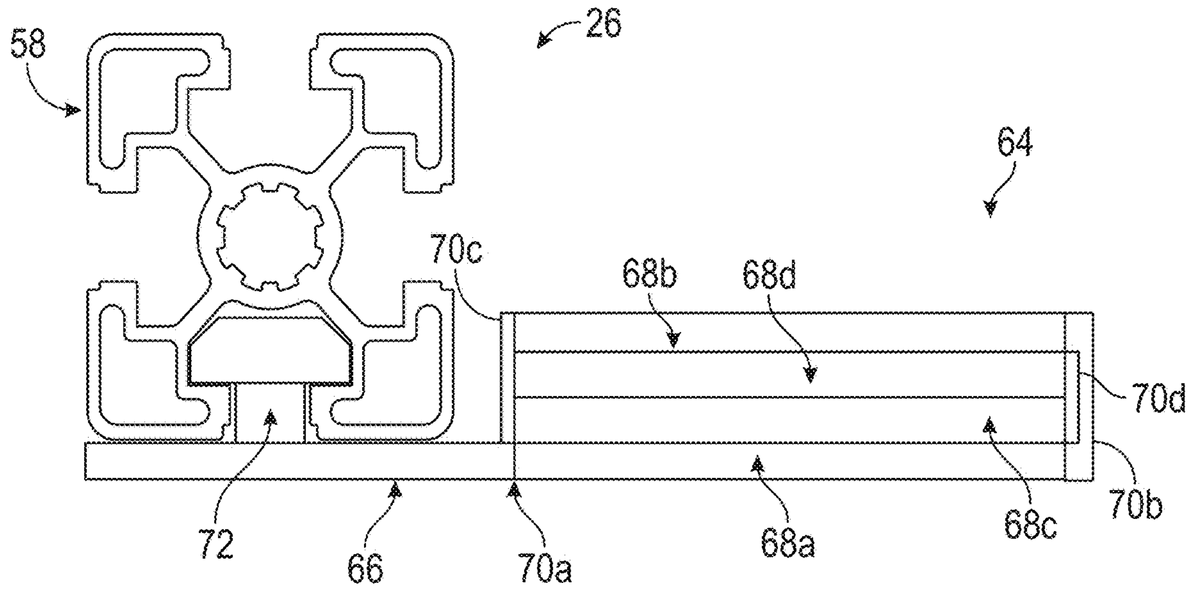
FIG. 7 schematically illustrates a cross-sectional view of a leg assembly of the portable tower in a folded position.
Figure 8:
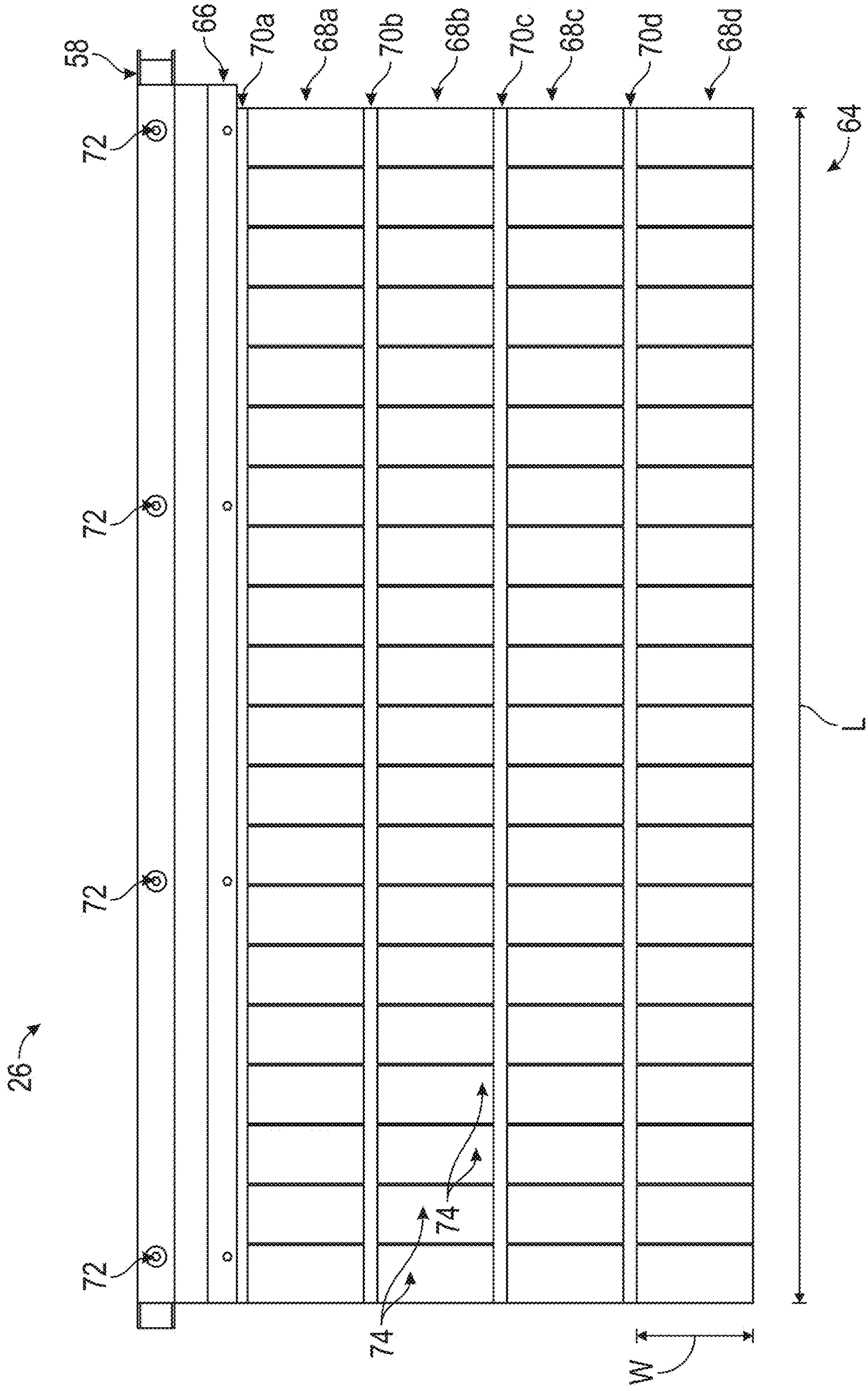
FIG. 8 illustrates a leg assembly of the portable tower in an unfolded position.

As shown in FIGS. 6-8, the solar panel assembly 64 of each leg 58 may include a connector section 66 and a plurality of foldable solar sections 68, with a joint 70 disposed between each section 66, 68. In the illustrated non-limiting example, each solar panel assembly 64 includes four foldable solar sections **68*a*, 68*b*, 68*c*, 68*d*, however more or less foldable solar sections 68 may be used within the scope of this disclosure. The connector section 66 connects directly to the leg 58, for example, via a plurality of fasteners 72. A first, innermost foldable solar sections 68*a* connects to the connector section 66 at a first joint 70*a*. A second foldable solar section 68*b* connects to the first foldable solar section 68*a* at a second joint 70*b*, and a third foldable solar section 68*c*, in turn, connects to the second foldable solar section 68*b* at a third joint 70*c*. Finally, a fourth, outermost foldable solar section 68*d* connects to the third foldable solar section 68*c* at a fourth joint 70*d*. In an example, the joints 70 may be formed by a fabric material, which may be connected to all of the foldable solar sections 68**.

The foldable solar panel assemblies 64 are movable between a folded position (FIGS. 4, 5, and 7) and an unfolded position (FIGS. 1, 3, and 8). FIG. 6 shows a solar panel assembly 64 in the process of unfolding. In the folded position, the foldable solar sections 68 are stacked upon each other. A latch (not shown) may secure the foldable solar sections 68 together in the folded position. The folded position reduces the size of the solar panel assemblies 64 and facilitates case of transportation. In the unfolded position, the foldable solar sections 68 lay flat on the ground 28 and adjacent to each other. In the unfolded position, the solar panel assemblies 64 may operate as solar panel arrays to convert energy from the sun into electrical power.

FIG. 7 shows a schematic cross-sectional view of a leg 58 and a stack of foldable solar sections 68 in the folded position. In this example, the second foldable solar section **68*b*, sits on top the stack, the fourth foldable solar section 68*d* sits directly under the second foldable solar section 68*b*, the third foldable solar section 68*c* sits directly under the fourth foldable solar section 68*d*, and the first foldable solar section 68*a* sits on the bottom of the stack. Thus, the fourth, outermost foldable solar section 68*d* is stacked directly between the second and third foldable solar sections 68*b*, 68*c* in the folded position. Likewise, the second foldable solar section 68*b* is stacked directly between the first foldable solar section 68*a*, and the fourth foldable solar section 68*d***.

FIG. 8 illustrates an overhead view of a leg assembly 26 with a foldable solar panel assembly 64 in an unfolded position. In an example, each foldable solar section 68 may have a uniform length L that is longer than a uniform width W, the length L running in a direction parallel to the leg 58 mounting the solar panel assembly 64. The foldable solar sections 68 may be arranged so their lengths L run parallel to each other, to the connector section 66, and to the leg 58. Thus, the foldable solar sections 68 may unfold in a direction that is perpendicular to the leg 58 mounting the solar panel assembly 64.

In an example, each foldable solar section 68 includes a plurality of solar cells 74 spaced along its length L. In an example, each foldable solar section 68 includes about sixty-eight solar cells 74. The solar cells 74 may consist of monocrystalline solar cells, polycrystalline solar cells, thin-film solar cells, or any other known photovoltaic cell. In an example, the plurality of solar cells 74 of each foldable solar section 68 are wired in series. The plurality of foldable solar sections 68 of each solar panel assembly 64 may be wired in parallel or in series relative to each other depending on voltage and current requirements of devices receiving power from the solar panel assembly 64. Likewise, the plurality of solar panel assemblies 64 as a whole may be wired in parallel or in series relative to each other depending on these requirements. Electrical wiring (not shown) runs from the connector section 66 of each solar panel assembly 64, through a respective leg 58, and to the pole base 48.

As discussed above, the pole base 48 may include various electronics to control and monitor operation of the portable tower 20. A charge controller may be included within the pole base 48 and connects between the solar panel assemblies 64 and the battery packs 56. The charge controller regulates the power going into the battery packs 56 from the solar panel assemblies 64 to prevent battery overcharging and drainage. The charge controller may further provide overcurrent protection. In an example, the charge controller is a maximum power point tracking (MPPT) solar charge controller.

In an example, the pole base 48 further includes a power management system that is configured to control which battery pack 56 is being used to power the electronics of the head assembly 22. In an example, only one battery pack 56 is used at a time to power the portable tower 20, and when a first battery pack 56 is discharged down to a threshold level of power, then the power management system switches to using a second battery pack 56 to power the portable tower. In an example, the threshold level is 20% of the storage capacity of the battery pack. This system allows a user to exchange a battery pack 56 while maintaining power.

In an example, the pole base 48 or the head assembly 22 further includes a inclinometer configured to measure the inclination of the portable tower 20 when deployed relative to horizontal.

The pole base 48 may further include a plug 76 to allow powering of the portable tower 20 and/or charging of the battery packs 56 by an external power source. The pole base 48 of the portable tower 20 may house an AC-to-DC inverter and/or a DC-DC step-up converter to allow powering of the portable tower 20 by an electrical grid, a vehicle, or a generator. In an example, a electricity of a set voltage is sent up through the electrical wiring of the pole section 24 to the control 46, regardless of the source powering the portable tower 20.

Figure 9:
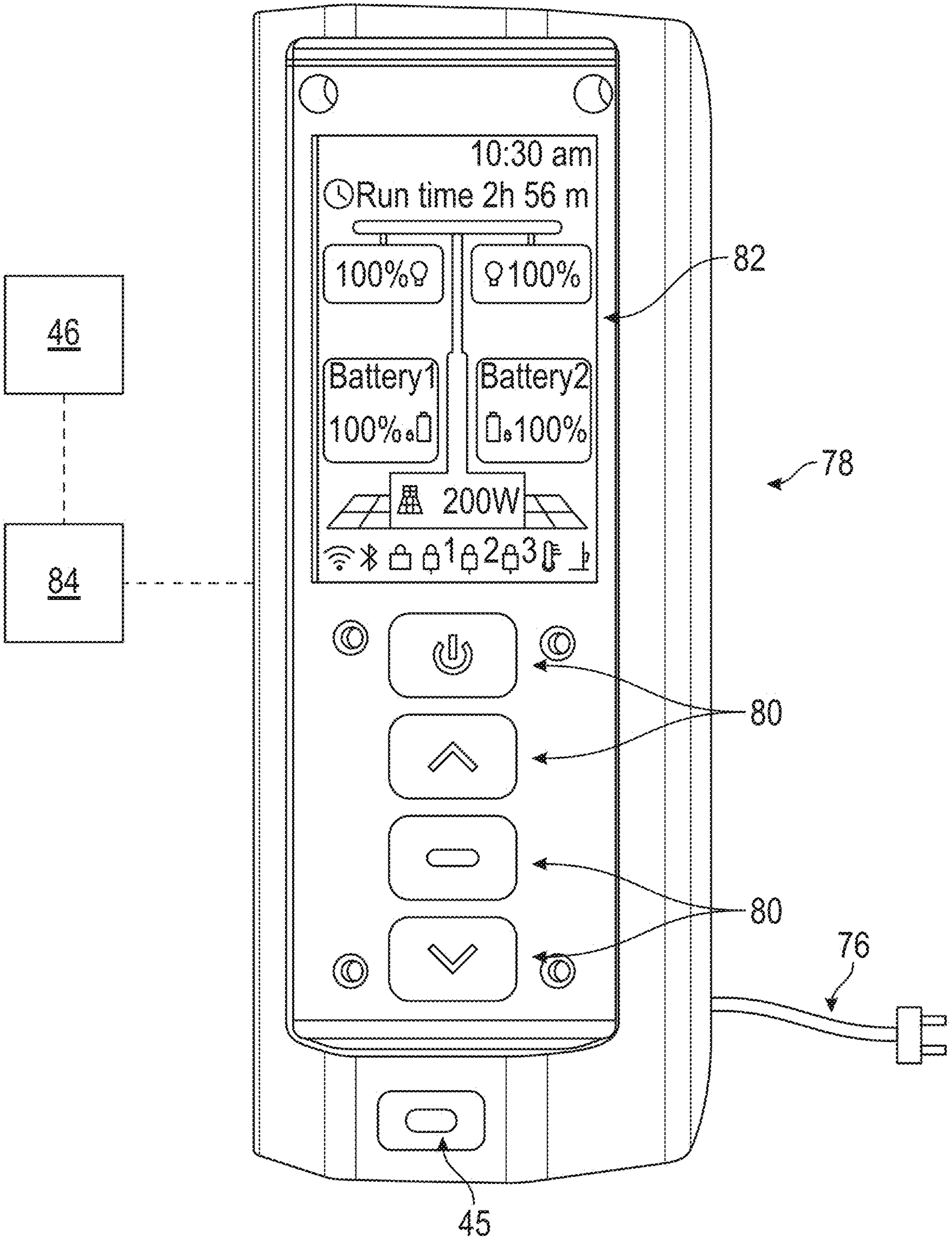
FIG. 9 illustrates an example user interface of the portable tower.

FIG. 9 illustrates an example user interface 78 which may be included on the pole base 48. The user interface 78 may include buttons 80 and a screen 82. The user interface 78 and/or the pole base 48 may further include one or more additional outlet ports 45, such as USB-C ports. The user interface 78 communicates with the control 46 and allows a user to control the lamps 36, cameras 38, or any other component mounted on the portable tower 20. In an example, the buttons 80 of the user interface 78 include an on/off button and buttons to control the brightness of the lamps 36.

The screen 82 may display various status information of the portable tower 20. In an example, the gas gauge of the battery packs 56 may be in communication with the user interface 78 such that the screen 82 displays information relating to energy storage and temperature statuses of the battery packs 56. The screen 82 may also provide an indication if one of the batter packs 56 is disconnected. The user interface 78 may further receive information from the control 46 and the screen 82 may display dimming levels or status of the lamps 36, status of the cameras 38 or images captured by the cameras 38, or a status indicating if any device is connected to the additional outlet ports 45 of the portable tower 20. Further, the user interface 78 may receive information from the solar panel assemblies 64 and the screen 82 may display information relating to how much solar energy the solar panel assemblies 64 are generating. The user interface 78 may further save and display information relating to the charge level of battery packs 56 over time or the energy production of the solar panel assemblies 64 over time, for example, over a 24-hour period. The inclinometer may further communicate information relating to the inclination angle of the portable tower 20 to the user interface 78 and this information may be displayed on the screen 82. In an example, the screen 82 may be an LCD touchscreen.

The portable tower 20 in an example further includes a wireless communication module 84 in communication with the control 46 and/or user interface 78. The wireless communication module 84 may communicate with a wireless controller (e.g., a mobile phone using a mobile application) to control components on the head assembly 22 via Wi-Fi, cellular data, Bluetooth, or any other known communication technique. The information discussed above with respect to the screen 82 may also be communicated to and displayed on a screen of the wireless controller.

The user interface 78 and/or wireless controller allow a user to selectively turn the lamps 36 on and off and dim the lamps 36 to a desired brightness. Further, the user interface 78 and/or wireless controller allow a user to control the orientation and field-of-view of the cameras 38, and control recording settings of the cameras 38. The user interface 78 further allows for schedule-based control and/or activation of the lamps 36 and/or cameras 38.

Figure 10:
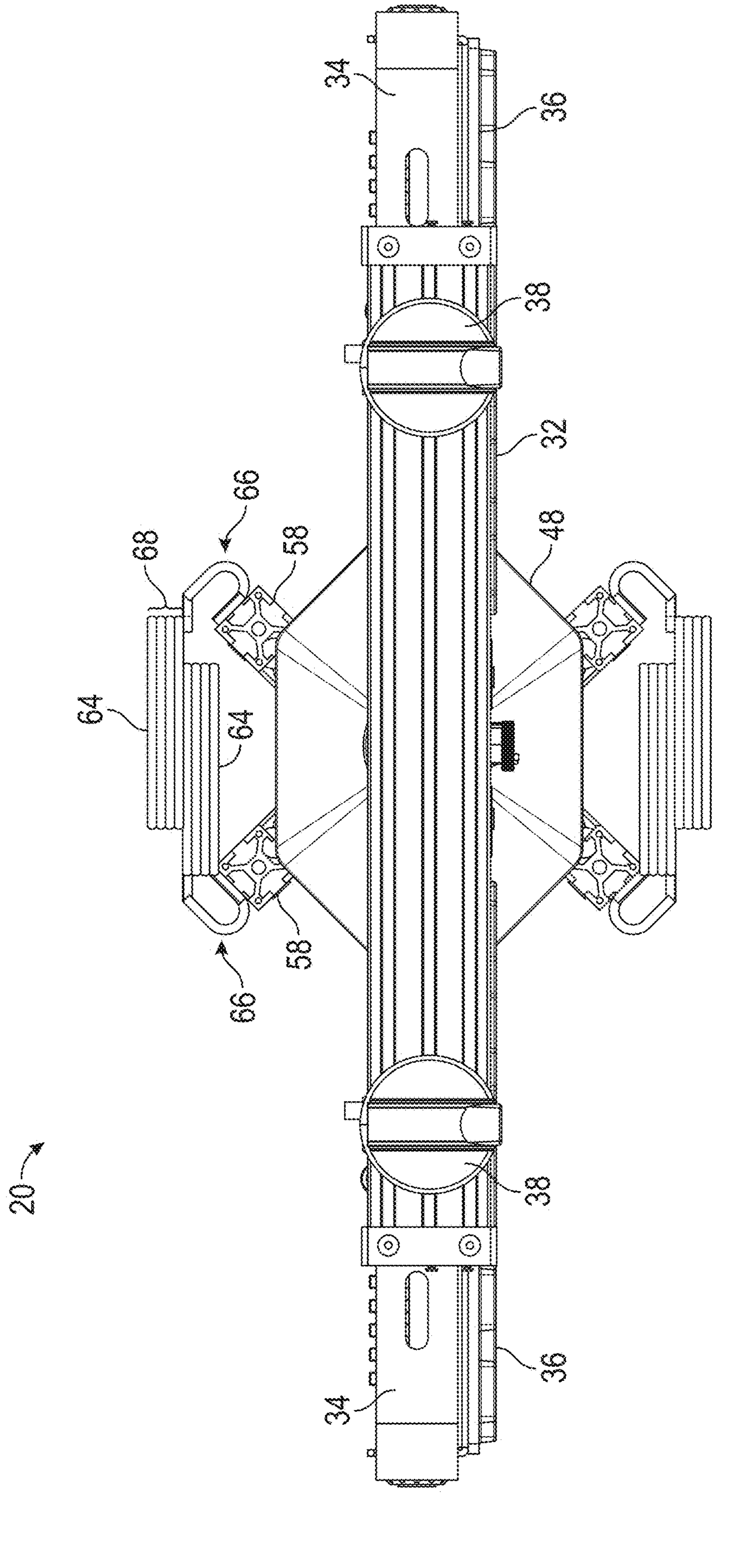
FIG. 10 illustrates a top-down view of the portable tower in the fully collapsed position.

FIG. 10 shows a top view of the portable tower 20 in a fully collapsed configuration. The connector section 66 may be made of flexible material such that the foldable solar sections 68 may be disposed on either side of the leg in either the folded position. As shown in FIG. 9, the folded stack of solar sections 68 of two adjacent solar panel assemblies 64 may abut and overlap in the fully collapsed position to reduce the footprint of the collapsed portable tower 20.

Figure 11:
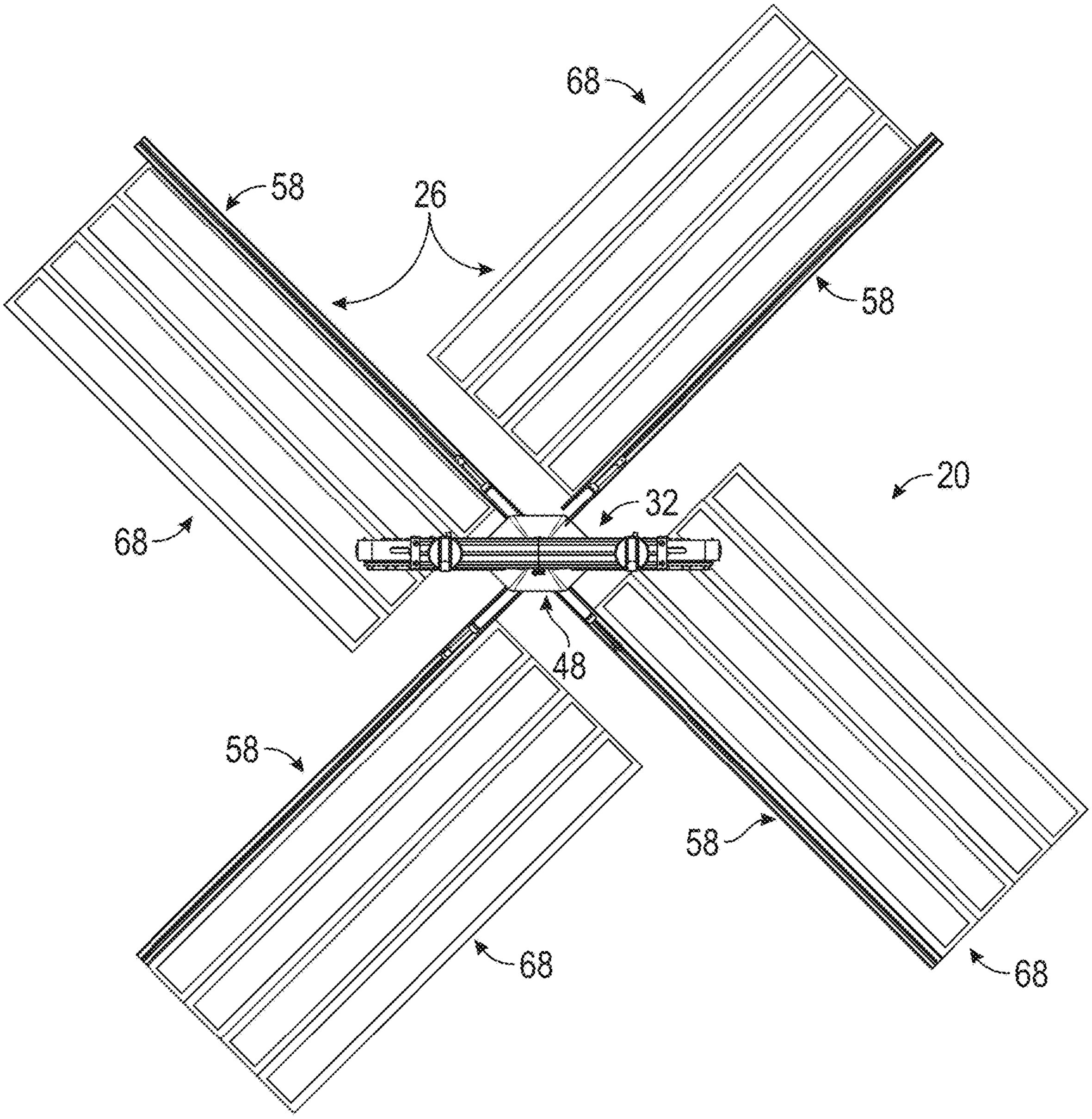
FIG. 11 illustrates a top-down view of the portable tower in the fully deployed position.

FIG. 11 shows a top view of the portable tower 20 in a fully deployed configuration. The legs 58 may generally extend at a 90° angle relative to one another. In an example, the head arm 32 extends in a direction that bisects the angle formed between two legs 58

Figure 12:
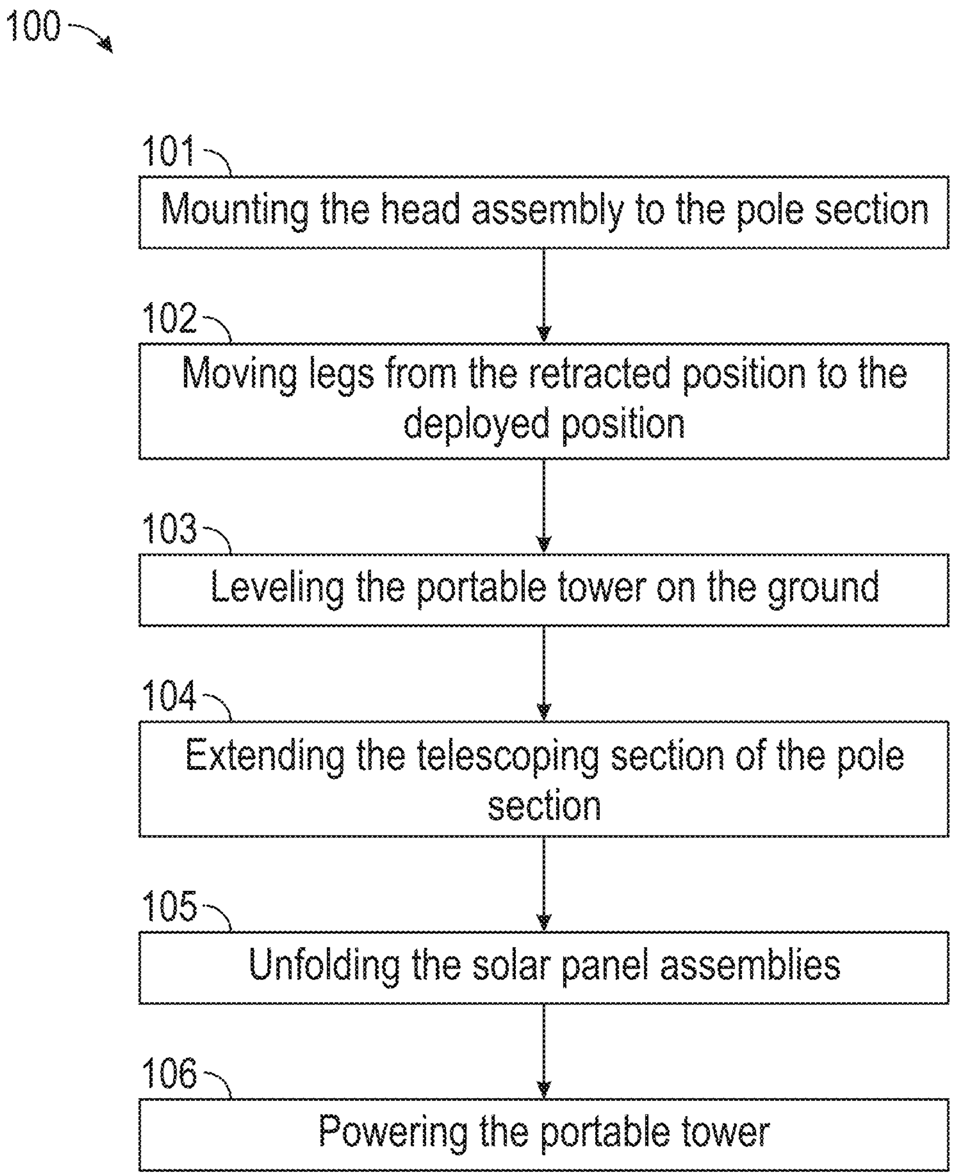
FIG. 12 illustrates a method of deploying the portable tower.

FIG. 12 discloses a method 100 of deploying the portable tower 20. At step 101, the head assembly 22 is mounted to the pole section 24. Step 101 may include tightening a threaded engagement between the head assembly 22 and pole section 24 and connecting electrical wiring in the head assembly 22 and pole section 24 via, for example, electrical wire connectors.

At step 102 the legs 58 are rotated from a retracted position to a deployed position wherein the legs 58 and leg supports 62 hold the pole section 24 vertically upright relative to the ground 28. Step 102 may include locking the leg supports 62 at an appropriate length. At step 103, the portable tower 20 is leveled on the ground 28. Step 103 may include manually adjusting the rotation of one or more legs 58 incrementally until the level 39 or data from the inclinometer indicates that the pole section 24 is not skewed, and then locking the legs 58 in place by locking the length of the leg supports 62.

At step 104, the telescoping section 50 of the pole section 24 is extended to a desired height and locked in place using a locking mechanism. At step 105, the solar panel assemblies 64 are unfolded. Step 105 may include disengaging latches holding the foldable solar sections 68 in a folded position, and uncurling the foldable solar sections 68 such that they lay flat on the ground 28 in a parallel row.

At step 106 the portable tower 20 is powered. Step 106 may include powering the portable tower 20 with any one or a combination of the battery packs 56, the solar panel assemblies 64, or an external power source. Step 106 may include connecting the solar panel assemblies 64 and/or battery packs 56 to the pole base 48, or connecting the plug 76 to a power grid, vehicle, or generator.

It should be understood that the portable tower 20 may be used without the solar panel assemblies 64 unfolded, for example, if the battery packs 56 already have sufficient charge or if sun conditions are not conducive to generating power with the solar panel assemblies 64. It should also be understood, that the preceding steps may be done in any appropriate order. For example, the telescoping section 50 may be extended (step 104) prior to deploying the legs 58 and orienting the portable tower 20 upright on the ground 28 (steps 102 and 103). Likewise, the solar panel assemblies 64 may be unfolded (step 105) prior to extending the telescoping section 50 (step 104). It should be further understood that the portable tower 20 may be collapsed for transport using the reverse procedure of method 100.

The portable tower 20 according to this disclosure is easy to transport and deploy while providing robust stability. The pole section 24 can be retracted, the legs 58 can be stowed against the pole section 24, and the solar panel assemblies 64 can be folded to reduce the size of the portable tower 20 for ease of transportation. The rotating legs 58 and adjustable leg supports 62 allow the portable tower 20 to be rapidly deployed on any surface. Likewise, due to the utilization of solar panel assemblies 64, the portable tower 20 can be deployed and power itself in any location, including more remote locations which do not have easy access to an electrical power grid. The portable tower 20 is also environmentally friendly. The portable tower 20 can provide portable lighting, surveillance, and other utilities using a sustainable solar power source and without requiring a connection to electrical grids, which are typically powered by greenhouse gases. Thus, the portable tower 20 provides a modular solution that can accommodate a variety of user needs while being self-powering and reducing greenhouse gas emissions.

Although a combination of features is shown in the illustrated examples, not all of them need to be combined to realize the benefits of this disclosure. In other words, a system designed according to an embodiment of this disclosure will not necessarily include all of the features shown in any one of the Figures or all of the portions schematically shown in the figures. Moreover, selected features of one example embodiment may be combined with select features of other example embodiments.

The proceeding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A portable tower comprising:

a head assembly;

a pole section including a telescoping section movable between a retracted position and an extended position, the telescoping section mounted to the head assembly;

a plurality of legs mounted to the pole section, each of the plurality of legs movable between a stowed position and a deployed position; and a solar panel assembly including a plurality of foldable solar sections, the solar panel assembly movable between a folded position wherein the foldable solar sections are stacked upon each other and an unfolded position wherein the foldable solar sections are adjacent to each other;

wherein the solar panel assembly folds out from the folded position to the unfolded position while at least one of the foldable solar sections remains pivotably attached to the portable tower;

wherein the portable tower is movable between a fully collapsed and a fully deployed position, and wherein in the fully collapsed position the telescoping section of the pole section is in the retracted position, the plurality of legs are each in the stowed position, and the solar panel assembly is in the folded position;

wherein each foldable solar section includes a length that is longer than a width, and wherein each solar section is configured to hinge relative to an adjacent foldable solar section about a joint axis that runs parallel to the direction of the lengths of the foldable solar sections.

2. The portable tower of claim 1, further comprising a battery pack removably attached to the pole section and forming an exterior surface of the portable tower, the battery pack configured to store power generated by the solar panel assembly and provide power to a component mounted on the head assembly.

3. The portable tower of claim 2, wherein the component mounted on the head assembly is one of a lamp and a camera.

4. The portable tower of claim 2, further comprising a user interface configured to allow a user to control operation of the component mounted on the head assembly.

5. The portable tower of claim 4, wherein the user interface is configured to display information relating to at least one of energy storage of the battery pack and power generation of the solar panel assembly.

6. The portable tower of claim 3, wherein:

the battery pack is a first battery pack, and further comprising a second battery pack;

the pole section includes a pole base and the telescoping section, the telescoping section extending between the pole base and the head assembly; and the first and second battery packs are disposed on opposed lateral sides of the pole base.

7. The portable tower of claim 6, further comprising a power management system configured to control which of the first and second battery pack provides power to the component mounted on the head assembly.

8. The portable tower of claim 7, wherein the power management system is configured to switch from using the first battery pack to power the component to using the second battery pack to power the component once the first battery pack is discharged down to a threshold level.

9. The portable tower of claim 1, wherein in the fully collapsed position the joint axes are oriented parallel to an axis of the pole section.

10. The portable tower of claim 1, wherein in the fully collapsed position the lengths of the foldable solar sections extend in a direction parallel to an axis of the pole section.

11. The portable tower of claim 1, wherein each foldable solar section includes a plurality of solar cells spaced along its length.

12. The portable tower of claim 11, wherein the solar cells of each foldable solar section are wired in series, and wherein the plurality of foldable solar sections are wired in parallel with respect to each other.

13. The portable tower of claim 1, wherein in the fully collapsed position the plurality of legs each extend in a direction that is parallel to an axis of the pole section.

14. The portable tower of claim 13, wherein:

each of the plurality of legs is rotatable about a hinge mounted to the pole section;

a leg support connects between each leg and the pole section; and the leg support is configured to lock each leg at a desired rotation from the pole section in the deployed position.

15. The portable tower of claim 1, wherein in the fully collapsed position the plurality of foldable solar sections are oriented parallel to a direction that the plurality of legs extend in.

16. The portable tower of claim 1, wherein at least one of the foldable solar sections is stacked between two other of the foldable solar sections in the folded position.

17. The portable tower of claim 1, wherein the solar panel assembly is one of a plurality of solar panel assemblies, each of the plurality of solar panel assemblies including a respective plurality of foldable solar sections.

18. A portable tower comprising:

a head assembly;

a pole section including a telescoping section movable between a retracted position and an extended position, the telescoping section mounted to the head assembly;

a plurality of legs mounted to the pole section, each of the plurality of legs movable between a stowed position and a deployed position; and a plurality of solar panel assemblies each including a plurality of foldable solar sections, each solar panel assembly movable between a folded position and an unfolded position; and wherein each of the plurality of solar panel assemblies are mounted to a respective one of the plurality of legs.

19. The portable tower of claim 18, wherein the foldable solar sections include a uniform length that is longer than a uniform width, the length running in a direction parallel to the leg mounting the solar panel assembly.

20. The portable tower of claim 18, wherein:

the portable tower is movable between a fully collapsed and a fully deployed position, and wherein in the fully collapsed position the telescoping section of the pole section is in the retracted position, the plurality of legs are each in the stowed position, and the solar panel assemblies are each in the folded position;

each foldable solar section is configured to hinge relative to an adjacent foldable solar section about a joint axis;

in the fully collapsed position the joint axes are oriented parallel to an axis of the pole section.

* * * * *